United States Patent [19]

Marcus

[11] Patent Number: 5,161,126

[45] Date of Patent: Nov. 3, 1992

[54] ACOUSTIC FLUTE WEB EDGE SENSOR

[75] Inventor: Michael A. Marcus, Honeoye Falls, N.Y.

[73] Assignee: Eastman Kodak Company, Rochester, N.Y.

[21] Appl. No.: 706,625

[22] Filed: May 29, 1991

[51] Int. Cl.$^5$ .............................................. G01S 15/00
[52] U.S. Cl. .................................... 367/99; 367/907
[58] Field of Search ............... 367/99, 100, 101, 102, 367/907

[56] References Cited

U.S. PATENT DOCUMENTS

| | | | |
|---|---|---|---|
| 3,694,800 | 9/1972 | Frank | 367/114 |
| 3,798,959 | 3/1974 | Bowles et al. | 73/37.5 |
| 3,914,754 | 10/1975 | Kirk | 181/123 |
| 4,049,954 | 9/1977 | Vieira et al. | 235/151.32 |
| 4,175,441 | 11/1979 | Urbanek et al. | 73/599 |
| 4,285,053 | 8/1981 | Kren et al. | 367/99 |
| 4,356,422 | 10/1982 | Van Maanen | 310/322 |
| 4,383,194 | 5/1983 | Ohigashi et al. | 310/326 |
| 4,494,841 | 1/1985 | Marcus | 354/21 |
| 4,850,232 | 7/1989 | Markis | 73/865.8 |

*Primary Examiner*—Daniel T. Pihulic
*Attorney, Agent, or Firm*—Hodgson, Russ, Andrews, Woods, Goodyear

[57] ABSTRACT

A method and apparatus for sensing the edge of a web which moves along a surface of a body wherein an acoustic pipe is provided in the body with an opening located so that the edge of the web covers a portion of the opening as a function of the position of the web, an air column in the pipe is caused to resonate so that the resultant acoustic signal has a frequency spectrum which is a function of the portion of the opening which is covered by the web, and the resultant acoustic signal is utilized to provide information relating to the location of the edge of the web. The opening can comprise a series of spaced apertures, some of which are covered by the web, or a continuous slot which is partially covered by the web. The resultant acoustic signal can be analyzed by scanning a range of signal frequencies to determine the location of the edge of the web. A web width sensor comprises a pair of adjacent web edge sensors, one for sensing the location of each web edge, for determining web width.

26 Claims, 5 Drawing Sheets

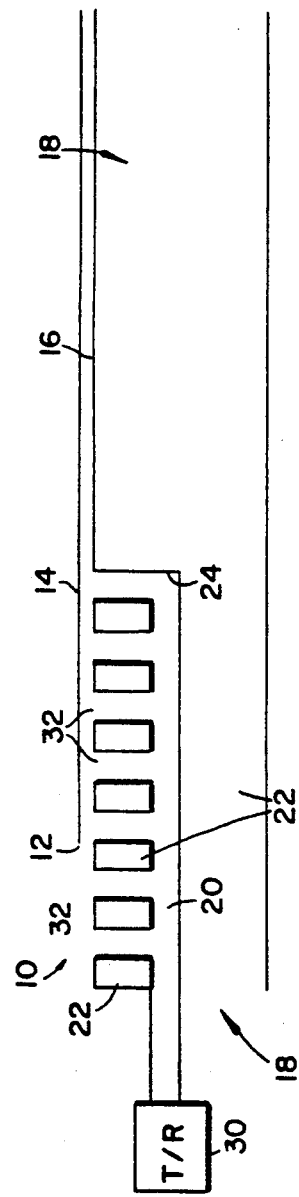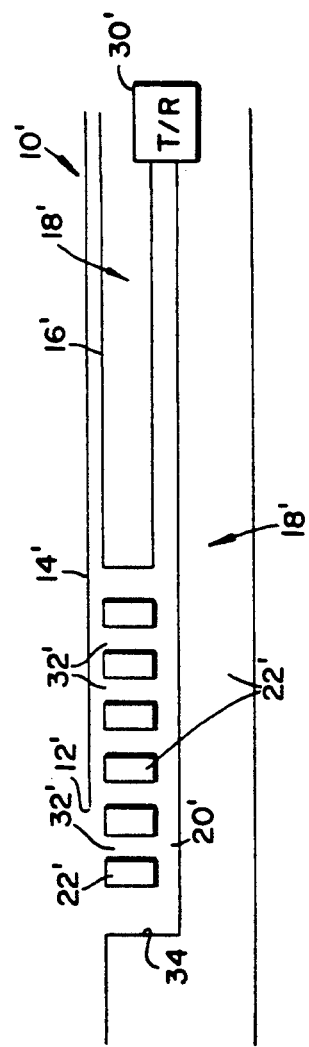
Fig.1a
Fig.1b

ACOUSTIC FLUTE WEB EDGE SENSOR

BACKGROUND OF THE INVENTION

This invention relates to the art of edge location sensing, and more particularly to a new and improved edge sensing method and apparatus employing acoustic energy.

One area of use of the present invention is in material handling where it is desired to sense the edge of a web of material passing along a surface, although the principles of the invention can be variously applied. An example is sensing or measuring the edge of a paper or film web as it is passing a roller surface. Prior art arrangements exist which utilize transmitted energy such as light or ultrasonic energy to measure one or more dimensions of a workpiece such as sheet material. Such arrangements often are complex and typically provide transmitting and receiving or detecting components on opposite sides of the sheet of material which intercepts the energy beams between the components.

It would, therefore, be highly desirable to provide a new and improved web edge sensing method and apparatus which is relatively simple in structure and operation, which operates at relatively low energy levels and which provides relatively high resolution.

SUMMARY OF THE INVENTION

It is, therefore, a primary object of this invention to provide a new and improved edge sensing method and apparatus employing acoustic energy.

It is a more particular object of this invention to provide such a method and apparatus which has relatively low energy requirements.

It is a further object of this invention to provide such a method and apparatus which achieves relatively high resolution.

It is a further object of this invention to provide such a method and apparatus which is relatively simple in structure and operation.

It is a more particular object of this invention to provide such a method and apparatus which is readily adaptable to material handling apparatus.

The present invention provides a method and apparatus for sensing the edge of a web which moves along a surface of a body wherein an acoustic pipe is provided in the body with an opening located so that the edge of the web covers a portion of the opening as a function of the position of the web, an air column in the pipe is caused to resonate so that the resultant acoustic signal has a frequency spectrum which is a function of the portion of the opening which is covered by the web, and the resultant acoustic signal is utilized to provide information relating to the location of the edge of the web. The opening can comprise a series of spaced apertures, some of which are covered by the web, or a continuous slot which is partially covered by the web. The resultant acoustic signal can be analyzed by scanning a range of signal frequencies to determine the location of the edge of the web. A pair of web edge sensors, one for sensing the location of each web edge, are used in determining web width.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1a is a diagrammatic view of an acoustic flute web edge sensor according to the present invention;

FIG. 1b is a diagrammatic view of an alternative form of the acoustic flute web edge sensor shown in FIG. 1a;

DETAILED DESCRIPTION OF THE ILLUSTRATIVE EMBODIMENTS

Figure 2:
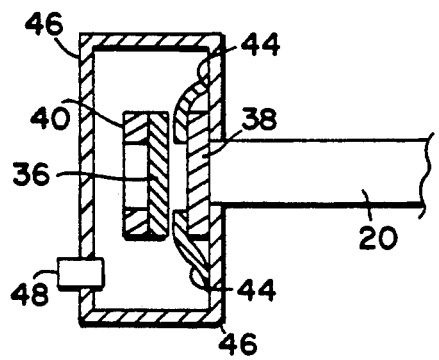
FIG. 2 is a diagrammatic view illustrating the transmitting/receiving means in the sensor of FIG. 1.

The edge sensor according to the present invention employs an acoustic flute or resonator in the form of a pipe or other surface containing a plurality of holes or a continuous slot positioned so that the edge of a web covers a portion of the slot or a number of holes as a function of its position. The air column in the pipe is caused to vibrate and the resultant acoustic signal has a resonant frequency spectrum which varies as the number of holes or portion of the slot covered by the web is varied. The resultant acoustic signal is analyzed to provide information relating to the location of the edge of the web. In particular, a signal detection means scans a range of signal frequencies to determine the number of holes uncovered on the portion of the slot uncovered.

Referring now to FIG. 1a, there is shown a sensor 10 of the present invention to measure the edge 12 of a paper or film web 14 as it is passing the surface 16 of a roller 18. The edge position sensor 10 consists of an acoustic flute built into the surface of the roller. FIG. 1 shows a sectional view of roller 18 with the acoustic flute structure embedded in the roller. In particular, there is provided an acoustic pipe comprising a fluid conducting region 20 of determinate length in the body 22 of roller 18. The pipe is closed at each end, i.e. by surface 24 at one end as shown in FIG. 1a and by the transmitting/receiving means 30 at the other end which will be described. The pipe has an opening between the ends for placing region 20 in fluid communication with surface 16. In this embodiment, the opening is provided by a series of spaced apertures 32 provided in the body 22 each extending radially outwardly from region 20 through surface 16. Preferably apertures 32 are of constant and equal diameter, equally spaced and extend along a substantially linear path. The holes 32 are of relatively small cross-sectional size or area. Advantageously, passage 20 and apertures 32 simply can be drilled in roller body 22 so that sensor 10 can be readily incorporated in existing rollers or the like.

During normal operation of sensor 10, it is assumed that the web 14 comes in contact with the roller 18, and that some of the holes 32, in the acoustic flute structure are normally covered. If the web 14 moves laterally a different number of holes 32 in the acoustic flute will be open, which affects the resonance frequency spectrum of the structure. As an example consider the case where 1/32" lateral resolution is required. To meet this requirement the individual hole diameters must be less than 1/64" and be spaced by 1/32".

The principle of operation is as follows. The fundamental resonance frequency of the structure increases as more holes 32 are covered, i.e. as web edge 12 moves to the left in FIG. 1a. Since the volume of the holes 32 is extremely small, very little air pressure, i.e. energy, is required to operate the sensor and drive the circuit. The far end of the pipe as shown in FIG. 1 is driven by means 30 which can comprise a piezoelectric transmitter/receiver which provides both excitation and reception of the resonance frequency.

While the transmitting receiving pair 30 is located on the left-hand side of the arrangement in FIG. 1a, i.e. laterally outwardly of the web edge 12, it can also be located on the right-hand side of the alternative form of sensor shown in FIG. 1b wherein like components are designated by the same reference numeral provided with a prime designation. In particular, sensor 10' measures edge 12' of web 14' as it passes over surface 16' of roller 18'. An acoustic pipe comprises a fluid conducting region 20' of determinate length in body 22' of roller 18', and the pipe is closed by a surface 34 at one end and by the transmitting/receiving means 30' at the other end. In this embodiment surface 34 is laterally outwardly of web edge 12' and transmitter/receiver 30' is laterally inwardly of web edge 12'. The acoustic pipe opening is provided by a series of spaced apertures 32' in body 22' extending radially outwardly from region 20' through surface 16' which apertures 32' are of relatively small cross-sectional size or area. Preferably apertures 32' are of constant and equal diameter, equally spaced and extend along a substantially linear path.

Sensor 10' operates according to the same principle as sensor 10, i.e. as web 14' moves laterally on roller 18' a different number of holes 32' in the acoustic flute will be open, which affects the resonance frequency spectrum of the structure. However, in sensor 10' the resonance frequency will decrease as more holes 32' are covered by web 14', i.e. as web edge 12' moves to the left as viewed in FIG. 1b.

One form of transmitting/receiving means 30 is shown in FIG. 2. There is provided a single pipe acoustic transducer configuration in which two polyvinylidene fluoride (PVF$_2$) transducers 36 and 38 are layered adjacent each other at the one end of pipe 20. In particular, transmitting transducer 36 is in the form of a disc held in place by mounting ring 40 and receiving transducer 38 also is in the form of a disc held in place by a mounting ring 42. The discs are separated by a shield 44 of metal or like conductive material which serves as a ground plane between the two transducers 36,38 for RFI shielding. The transducers are located within a conductive housing 46 which provides additional shielding for receiving transducer 38 to eliminate unwanted noise sources. Electrical leads (not shown in FIG. 2) from transducers 36,38 are connected to a terminal structure 48 insulated from housing 46 for making electrical connection to the transducer driving and detecting circuitry which will be described.

Polyvinylidene fluoride (PVF$_2$), a polymer which exhibits piezoelectric and pyroelectric properties when appropriately polarized, is preferred as the transmitter T and receiver R material. However, the transmitter T and receiver R can be ceramic piezoelectric transducers as well. In fact, transmitter T can be any acoustic generator means including moving diaphragm loudspeakers or air jets. The receiver R can be any kind of microphone.

Miniature PVF$_2$ acoustic transducers which are coupled to miniature pipes, such as transducers 36,38 coupled to pipe 20, utilize both the direct and converse piezoelectric effects. A PVF$_2$ transmitter (electromechanical converter) like disc 36 sends acoustic energy down a pipe like passage 20. Acoustic energy is either transmitted through the pipe orifice i.e. apertures 32, or reflected to a second PVF$_2$ transducer used as a receiver of acoustic energy (mechano-electric converter) like disc 38. Changing the state of the orifice such as closing the hole or moving an object near it changes the amplitude and/or phase of the electrical signal produced by the receiving transducer. When the electrical drive frequency is adjusted to a mechanical pipe resonance large increases in sensitivity occur. This is due to the fact that if a pipe is tuned for an open resonance closing the port will frustrate the resonance and destroy the standing wave. Similarly, if the pipe is tuned for a closed resonance opening the port will destroy the standing wave, thus decreasing the acoustic energy incident upon the receiver.

For more information on the general operation of acoustic transducer arrangements, reference may be made to U.S. Pat. No. 3,694,800 issued Sep. 26, 1972 entitled "Acoustical Gauge" and assigned to the assignee of the present invention. For more information on the structure and operation of a transmitting and receiving pair like that shown in FIG. 2, reference may be made to U.S. Pat. No. 4,494,841 issued Jan. 22, 1985 entitled "Acoustic Transducers For Acoustic Position Sensing Apparatus" and assigned to the assignee of the present invention. The disclosures of both of these references are hereby incorporated by reference.

Figure 3:
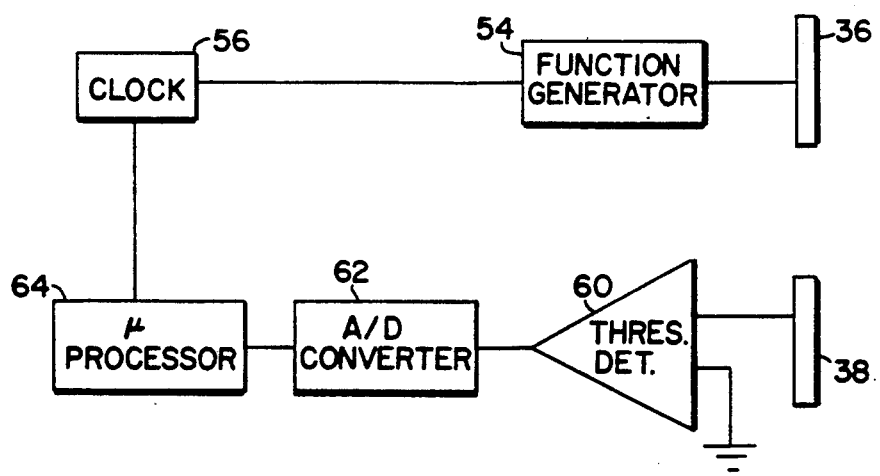
FIG. 3 is a schematic block diagram further illustrating the sensor of FIG. 1.
Figure 4:
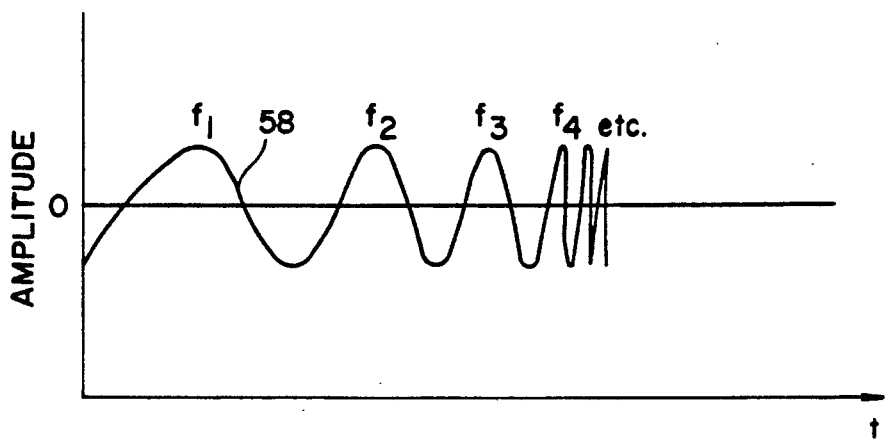
FIGS. 4 and 5 are graphs including waveforms illustrating operation of the sensor of FIG. 1.

Various approaches are available for the drive/detection circuitry associated with transducers 36,38. According to one approach, the acoustic pipe 20 is excited with a linear combination of all of the resonance frequencies, and the relative intensitites of these frequencies are analyzed. In particular, a clock pulse starts a frequency ramp, and the receiver amplitude is measured as a function of time from initiation of the clock pulse. The time interval for the maximum signal is determined which locates which hole 32 the web edge 12 is on. A circuit for implementing this approach is shown in FIG. 3. Transmitting transducer 36 is driven by a function generator 54 under control of a clock 56. The output pulse from clock 56 starts the frequency ramp provided by generator 54, and waveform 58 in FIG. 4 illustrates the frequency ramp output of generator 54. The output of receiver 38 is connected to the input of an amplifier-threshold detector combination 60 which, in turn, is connected to the input of an analog to digital converter 62 which provides digital signal inputs to a microprocessor 64.

Figure 5:
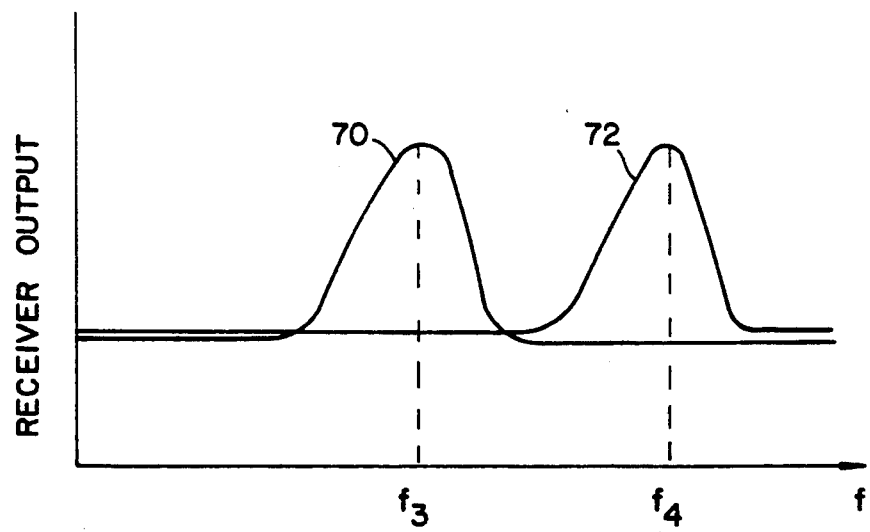

The output signal from receiver 38 is illustrated by the waveforms in FIG. 5. In particular, waveform 70 represents the receiver output when three holes 32 are covered by web 14 and waveform 72 represents the receiver output when four holes 32 are covered by web 14. The operation is based on the fact that transmitter 36 and pipe 20 are tuned for closed tube resonance such that as more holes 32 are covered by web 14 the resonance frequency of the structure increases. By way of further illustration, the frequencies for closed pipe resonance are given by the relationship $$fn = \frac{2n-1}{4}\frac{c}{L}$$

where n is an integer, c is the speed of sound and L is the length of the acoustic pipe.

The frequency information in the receiver output is digitized and supplied to microprocessor 64 which previously has been provided with information as to the resonant frequency for each hole location so that microprocessor 64 can map the frequency signal from receiver 38 to a particular hole location thereby determining the location of the edge 12 of the web 14.

Figure 6:
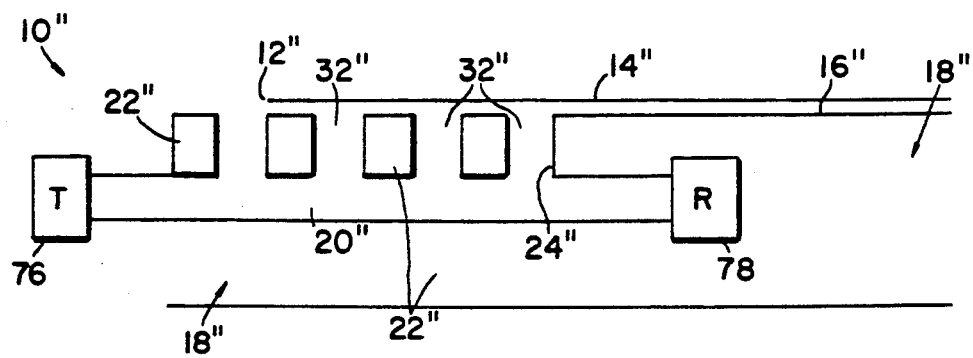
FIG. 6 is a diagrammatic view illustrating an alternative form of transmitting/receiving means in the sensor of the present invention.

In the sensor 10 shown in FIGS. 1a and 1b, a combined transmitter/receiver 30 is provided at the one end of acoustic pipe 20. Alternatively, separate transmitter and receiver components can be provided at opposite ends of the acoustic pipe as shown in FIG. 6 wherein components identical to those of the sensor of FIG. 1 are indentified by the same reference numeral having a double prime designation. Thus a transmitter 76 is provided at the left-hand end of pipe 20" as shown in FIG. 6 and transmitter 76 can comprise a PVF2 disc within a housing according to the arrangement of FIG. 2. Similarly, a receiver 78 is provided at the right-hand side end of pipe 20" as shown in FIG. 6 and receiver 78 can comprise a PVF2 disc within a housing according to the arrangement of FIG. 2.

As previously described, other transmitter and receiver materials can be employed. The spaced - apart transmitter and receiver components are connected by electrical leads (not shown) to a driver/detector circuit like that of FIG. 3.

Figure 7:
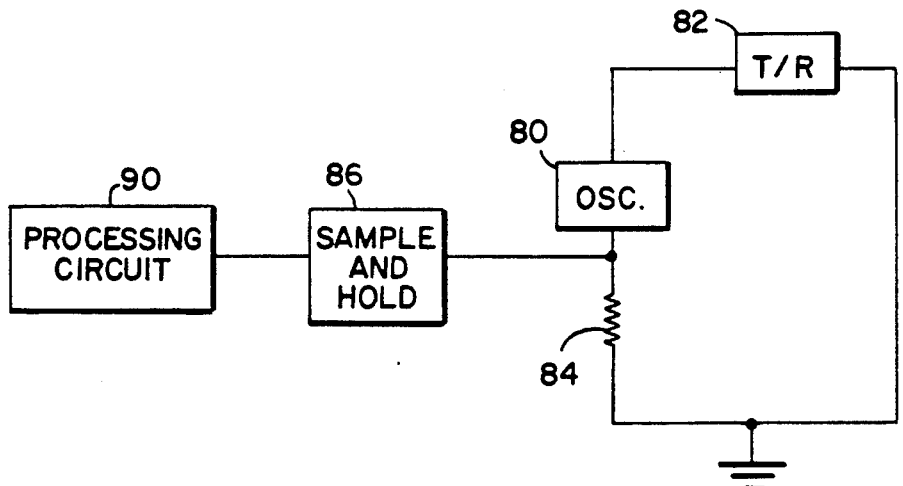
FIG. 7 is a schematic block diagram illustrating an alternative form of the sensor of the present invention.

According to another approach for the drive/detection circuitry for transducers 36, 38 a white noise burst is sent down acoustic pipe 20 and the return signal is analyzed by taking its Fourier transform to determine its resonance frequency spectrum. The Fourier transform looks at the frequency spectrum of the noise burst. As the web edge position is altered, different frequency components will be maximized as a function of the position of the web. A circuit for accomplishing the foregoing is illustrated in FIG. 7 and features a self-tuned oscillator designated 80 which functions to look for the maximum signal at the receiver output and picks out that frequency. The self-tuned oscillator provides increased power output at the resonant frequency. In the circuit of FIG. 7, the combination transmitter/receiver 82 similar to transmitter/receiver 30 of FIG. 1 and a voltage-dropping resistance 84 are connected to self-tuned oscillator 80. The voltage/time signal appearing across resistance 84 is applied to the input of a sample and hold circuit 86 which holds the maximum signal for measurement by a processing circuit 90. From the voltage/time signal, frequency information is obtained and by comparing this to the frequencies of the hole locations, the frequency information in the voltage/time signal can be mapped to the hole locations thereby providing information as to the location of the web edge. In certain acoustic flute designs more than one local maxima in frequency may be needed in order to determine web position.

Figure 8:
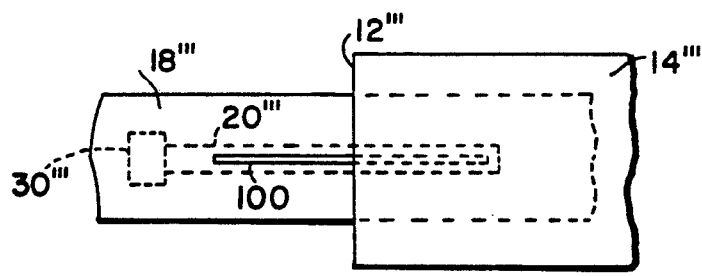
FIG. 8 is a diagrammatic view illustrating an alternative form of opening in the sensor of the present invention.

An alternative to the individual holes 32 shown in FIGS. 1a and 1b is to provide a continuous elongated narrow slot 100 in the body of roller 18''' as shown in FIG. 8. Slot 100 is in communication with acoustic pipe 20''' which has a transmitter/receiver 30''' associated therewith as in the previous embodiment. While transmitter/receiver 30''' is shown in the location of FIG. 1a, it could be located as shown in FIG. 1b. Slot 100 is partially covered by web 14'', and the resonance frequency increases as the effective length of slot 100 is decreased in response to movement of web 14'''. The same driver/detection circuits are used to provide information as to the location of web edge 12'', and as in the precious embodiment the useful operating frequency range is 10 KHZ to 100 KHZ.

Figure 9:
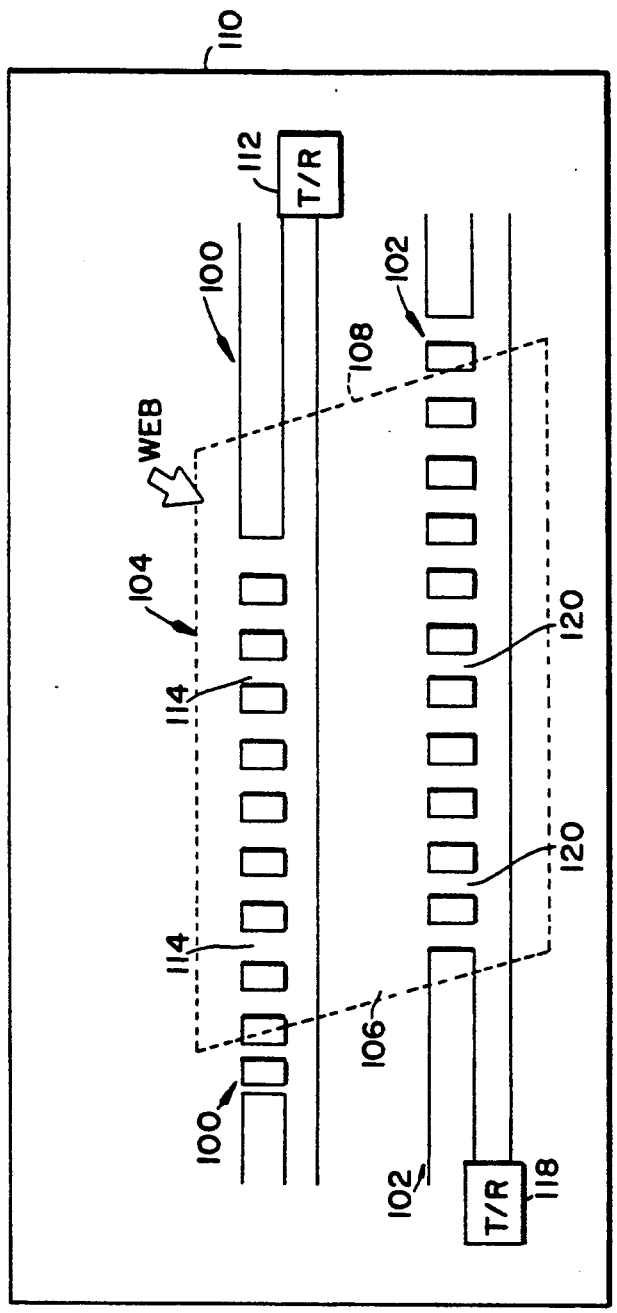
FIG. 9 is a diagrammatic view of an acoustic flute web width sensor according to the present invention.

FIG. 9 illustrates an acoustic flute web width sensor according to the present invention including first and second web edge sensors 100,102 located adjacent each other along the direction of travel of a web 104 and operatively associated with corresponding ones of the opposite web edges 106,108. Typically the sensor of FIG. 9 is used to sense the width of web 104 as it travels over the surface of the roller designated 110, and in this situation sensors 100,102 are built into roller 110. Alternatively, the two sensors 100,102 can be in a pair of rollers facing each other which are in contact at a nip.

In particular, sensor 100 is an acoustic flute web edge sensor similar to sensor 10' shown in FIG. 1b and is used to sense the location of web edge 106. The transmitting/receiving means 112 of sensor 100 is located so that a major portion of sensor openings 114 are located between web edge 106 and transmitter/receiver 112. As a result, as the number of openings 114 covered by web 104 increases, i.e. as web edge 106 moves to the left in FIG. 9, the resonance frequency decreases. Similarly, sensor 102 is an acoustic flute web edge sensor similar to sensor 10' shown in FIG. 1b and is used to sense the location of web edge 108. The transmitting/receiving means 118 of sensor 102 is located so that a major portion of sensor openings 120 are located between web edge 108 and transmitter/receiver 118. As a result, as the number of openings 120 covered by web 104 increases, i.e. as web edge 108 moves to the right in FIG. 9, the resonance frequency decreases.

The location of the position of both edges 106,108 by the foregoing arrangement effectively determines web width. Each of the sensors 100,102 would be provided with appropriate drive/detection circuitry like that shown and described in connection with FIGS. 3 and 7. An example of the web width sensor of FIG. 9 has applicability to a photoprocessor. The two sensor system is used to monitor sheet width. Film of unknown width is fed into the photoprocessor through the measurement rollers at a constant rate. The film is developed in the photoprocessor. The frequency of photoprocessing chemical replenishment is dependent upon the area of film treated. The width of web fed into the photoprocessor would be tracked as a function of time and chemicals added as needed. The web width sensor of FIG. 9 would be incorporated in one of the measurement rollers.

By way of further illustration, multiple sets of flute transducers can be provided in a roller if necessary to enhance the sampling rate, since the flute is active only where the web is perpendicular to the holes. Furthermore, while the sensor of the present invention has been described in connection with a roller, it can be employed in other material handling apparatus and in other structures where it is desired to sense the location of the edge of a stationary or moving web.

It is therefore apparent that the present invention accomplishes its intended objects. There is provided a new and improved edge sensing method and apparatus which employs acoustic energy, which has relatively low energy requirements, and which achieves relatively high resolution. The sensor is relatively simple in structure and operation and is readily adaptable to existing material handling and like apparatus.

While embodiments of the present invention have been described in detail, that is for the purpose of illustration, not limitation.

What is claimed is:

1. A web edge sensor comprising:
   a) means for defining an acoustic pipe having an opening located so that the edge of a web covers a portion of the opening as a function of the position of the web; and
   b) means operatively associated with said acoustic pipe for causing an air column in said pipe to resonate so that the resultant acoustic signal has a resonant frequency spectrum which is a function of the portion of the opening which is covered by the web.

2. Apparatus according to claim 1, further including means in communication with the air column in said acoustic pipe for utilizing the resultant acoustic signal to provide information relating to the location of said edge of said web.

3. Apparatus according to claim 2, wherein said utilizing means comprises signal detection means for scanning a range of signal frequencies to determine the location of said edge of said web.

4. Apparatus according to claim 2, wherein said means for causing said air column to resonate comprises means for sending a white noise burst along said pipe and wherein said utilizing means comprises signal analyzing means for determining the resonant frequencies of the return signal utilizing the Fourier transform thereof.

5. Apparatus according to claim 2, wherein said means for causing said air column to resonate comprises means for exciting the acoustic pipe with a linear combination of all of the resonant frequencies of said pipe and wherein said utilizing means comprises means for analyzing the relative intensities of said resonant frequencies.

6. Apparatus according to claim 3, wherein said signal detection means includes a self-tuned oscillator means.

7. Apparatus according to claim 1, wherein said opening comprises a series of spaced apertures and said web covers at least some of said apertures.

8. Apparatus according to claim 1, wherein said opening comprises a continuous slot and said web covers a portion of said slot.

9. An acoustic web edge sensor comprising:
   a) a body having a surface over which a web having an edge is movable;
   b) an acoustic pipe comprising a fluid conducting region of determinate length in said body, said pipe being closed at each end and having an opening between said ends for placing said region in fluid communication with said surface;
   c) said web being located on said surface with said edge in said opening and said web initially covering a portion of said opening; and
   d) acoustic transmitting/receiving means operatively connected to said acoustic pipe for sending acoustic energy along said pipe and for receiving reflected acoustic energy in said pipe;
   e) so that as said web moves along said surface in a direction changing the portion of said opening covered by said web an acoustic signal is produced which contains information as to the location of said edge of said web.

10. Apparatus according to claim 9, wherein said acoustic signal has a resonant frequency spectrum which varies according to the portion of the opening covered by said web and wherein said apparatus further comprises signal detection means for scanning a range of signal frequencies to determine the location of said edge of said web.

11. Apparatus according to claim 10, wherein said signal detection means includes self-turned oscillator means.

12. Apparatus according to claim 9, wherein said acoustic transmitting/receiving means comprises:
   a) means for sending a white noise burst along said acoustic pipe; and
   b) signal analyzing means for determining the resonant frequency spectrum of the return signal utilizing the Fourier transform thereof.

13. Apparatus according to claim 9, wherein said acoustic transmitting/receiving means comprises:
   a means for exciting the acoustic pipe with a linear combination of all of the resonant frequencies of said pipe; and
   b) means for analyzing the relative intensities of said resonant frequencies.

14. Apparatus according to claim 9, wherein said opening comprises a series of apertures spaced along said surface.

15. Apparatus according to claim 14, wherein the spacing between individual apertures is equal to the required lateral resolution in the location of the edge of said web and the dimension of each aperture in a lateral direction is one-half the required lateral resolution.

16. Apparatus according to claim 9, wherein said opening comprises a continuous slot extending along said surface.

17. A web width sensor comprising:
   a) a first acoustic flute web edge sensor for providing an acoustic signal indicative of the location of one edge of a web;
   b) a second acoustic flute web edge sensor for providing an acoustic signal indicative of the location of the other edge of the web; and
   c) so that by locating the positions of both edges of the web the width of the web is determined.

18. Apparatus according to claim 17, wherein each of said first and second web edge sensors comprises:
   a) means for defining an acoustic pipe having an opening located so that the edge of a web covers a portion of the opening as a function of the position of the web; and
   b) means operatively associated with said acoustic pipe for causing an air column in said pipe to resonate so that the resultant acoustic signal has a resonant frequency spectrum which is a function of the portion of the opening which is covered by the web.

19. Apparatus according to claim 18, further including means in communication with the air column in said acoustic pipe for utilizing the resultant acoustic signal to provide information relating to the location of said edge of said web.

20. An acoustic web width sensor comprising:

a) a body having a surface over which a web having a pair of edges is movable;

b) a first acoustic pipe comprising a fluid conducting region of determinate length in said body, said pipe being closed at each end and having an opening between said ends for placing said region in fluid communication with said surface;

c) said web being located on said surface with one of said edges in said opening and said web initially covering a portion of said opening;

d) first acoustic transmitting/receiving means operatively connected to said acoustic pipe for sending acoustic energy along said pipe and for receiving reflected acoustic energy in said pipe;

e) a second acoustic pipe comprising a fluid conducting region of determinate length in said body, said pipe being closed at each end and having an opening between said ends for placing said region in fluid communication with said surface;

f) said web being located on said surface with the other of said edges in said opening of said second acoustic pipe and said web initially covering a portion of said opening; and g) second acoustic transmitting/receiving means operatively connected to said second acoustic pipe for sending acoustic energy along said pipe and for receiving reflected acoustic energy in said pipe;

h) so that as said web moves along said surface in a direction changing the portions of said openings covered by said web acoustic signals are produced which contain information as to the location of said edges of said web thereby determining the width of said web.

21. Apparatus according to claim 20, wherein each of said acoustic signals has a resonant frequency spectrum which varies according to the portion of the corresponding opening covered by said web and wherein said apparatus further comprises signal detection means for scanning a range of signal frequencies to determine the locations of said edges of said web.

22. A method for sensing the edge of a web comprising the steps of:

a) providing an acoustic pipe in a body having a surface contacted by said web, said pipe having an opening located so that the edge of the web covers a portion of the opening as a function of the position of the web;

b) causing an air column in said pipe to resonate so that the resultant acoustic signal has a resonant frequency spectrum which is a function of the portion of the opening which is covered by the web; and c) utilizing the resultant acoustic signal to provide information relating to the location of said edge of said web.

23. A method according to claim 22, wherein said step of utilizing the resultant acoustic signal includes scanning a range of signal frequencies to determine the location of said edge of said web.

24. A method according to claim 23, wherein said step of causing said air column to resonate comprises sending a white noise burst along said pipe and wherein said steps of utilizing the resultant signal comprises analyzing the return signal by taking the Fourier transform thereof to determine the resonant frequency spectrum of the signal to determine the location of the edge of said web.

25. A method according to claim 23, wherein said step of causing said air column to resonate comprises exciting said acoustic pipe with a linear combination of all of the resonant frequencies and wherein said step of utilizing the resultant signal comprises analyzing the relative intensities of said frequencies to determine the location of the edge of said web.

26. A method for sensing the width of a web comprising the steps of:

a) providing a first acoustic flute web edge sensor in operative association with one of the edges of the web to produce an acoustic signal indicative of the location of said one edge;

b) providing a second acoustic flute web edge sensor in operative association with the other edge of the web to produce an acoustic signal indicative of the location of said other edge; and c) utilizing the resultant acoustic signals to provide information as to the locations of the edges of the web thereby determining the width of the web.

* * * * *